United States Patent Office 3,663,692
Patented May 16, 1972

3,663,692
METHODS OF BIRD CONTROL
Morley R. Kare, 215 Fairview Road,
Narberth, Pa. 19072
No Drawing. Continuation-in-part of application Ser. No. 585,286, Oct. 10, 1966. This application Dec. 29, 1969, Ser. No. 888,844
Int. Cl. A01n 9/12, 9/22, 11/00
U.S. Cl. 424—153  10 Claims

ABSTRACT OF THE DISCLOSURE

Bird populations are controlled and mortality is increased by applying a bio-affecting composition which can be absorbed through a bird's feet to roosting and nesting areas. A particularly preferred composition comprises caffeine carried in a low volatile liquid such as glycerin or vegetable oil.

This is a continuation-in-part of application Ser. No. 585,286, filed Oct. 10, 1966, now abandoned.

BACKGROUND OF THE INVENTION

It is well recognized that the presence of birds is frequently a health hazard and a nuisance, particularly in highly populated areas and on city buildings and the like, sparrows, pigeons and starlings being among the species most frequently causing trouble. Moreover even in agricultural areas birds are frequently undesired pests because of the damage they can cause in feeding upon grain crops, such as corn, newly planted seeds, fruit and the like. As used herein the term "birds" is intended to include all members of the class "Aves," both domestic and wild. While the methods of the present invention will be useful mainly for control of wild birds, they may at times be advantageously used for controlling depredations of domestic birds as well. Other examples of birds to which the methods can be applied are crows, black birds, cow birds, hawks, etc., as well as ducks, geese, pheasants and prairie chickens.

Control of pest bird populations, such as starlings and pigeons, poses difficult problems especially in urban areas. Any control program must be avian specific and safe to pets and humans. In addition, bird control methods very desirably should be species specific, sparing song birds and other desirable types. These requirements preclude the use of any conventional type of poisoning program.

SUMMARY OF THE INVENTION

It has now been found that selected chemical compounds can be readily absorbed through the feet of birds and thereby produce extreme physiological reactions. Certain of these compounds, such as caffeine, are relatively non-toxic to humans while being lethal to birds. These compounds may be used for bird population control by application to nesting and roosting areas.

Hence it is an object of this invention to administer bio-affecting compositions to birds by absorption through their feet.

Another object of this invention is to control bird populations by applying a compound having avicidal properties to bird nesting and roosting areas.

DETAILED DESCRIPTION OF THE INVENTION

Population control of pest birds may be accomplished by contacting birds' feet with certain selected chemical compounds. These compounds have two properties in common; they are readily absorbed into the blood stream through the closely-packed cell mass making up the bottom of a bird's feet and they exhibit substantial bio-affecting or physiological activity after absorption. To exhibit substantial control effects, it is not necessary that the absorbed chemical directly kill the bird. It is sufficient in most cases that the absorbed compound merely causes severe disruption of normal physical or metabolic activity. Such disruptions in of themselves substantially lessen the survival rate of birds in their natural environment.

Chemicals found to be useful differ widely in composition. Caffeine and inorganic, ionic lithium salts such as the carbonate and chloride, have been found especially useful. Certain other chemicals, classifiable generally as anorexics and anesthetice, also find use in the process.

Those chemicals in liquid form may be applied directly without diluents or extenders although this is usually not the preferred mode. Those chemicals which are normally solid are most conveniently applied as a solution or suspension in an appropriate solvent or absorbed on a solid carrier. The carrier or diluent must be inert toward the dissolved or absorbed chemical substance and must not significantly repel birds. In the case of liquid diluents or carriers, low volatility is preferred so that the active life of the preparation after application is enhanced. In some instances where short term effects are desired, a highly volatile solvent or diluent is useful. Concentration of the active chemical compound in the carrier or diluent is not critical and can range from about 1% to the solubility limits of the system.

Since only small amounts of the chemical control agents are necessary, a diluent of some kind is ordinarily employed for application. The control compositions are ordinarily prepared as particulate solids (i.e. dusts) or liquid concentrate compositions comprising the active control agent with either a particulate solid or liquid adjuvant which are formulation aids or conditioning agents permitting the concentrate composition to be readily mixed with a suitable solid or liquid diluent for application of the active control agent on soil or other surfaces in a concentration suitable for achieving the desired controlling effect. The control composition should be formulated so as to permit a uniform predetermined application of the composition to the bird environment to produce the desired effect.

Adjuvants useful in preparing the compositions include particulate solid or liquid extending agents, such as solvents or diluents within which the active ingredient is dissolved or suspended, wetting or emulsifying agents which serve in providing uniform dispersions or solutions of the active agent in the extending agents, and adhesive agents or spreading agents which improve the contact of the active ingredient with the treated surfaces.

The active ingredient need not be dissolved in the extending agent but may merely be dispersed or suspended in the extending agent as a suspension or an emulsion. Also, the active agent may first be dissolved in a suitable organic solvent and the organic solution of the active agent then incorporated in water or an aqueous extending agent to form a heterogeneous dispersion. Examples of some suitable organic solvents include benzene, hexane, toluene, acetone, cyclohexanone, methylethylketone, isopropanol, butanediol, methanol, xylene, dioxane, isopropyl ether, ethylene dichloride, tetrachloroethane, hydrogenated naphthalene, solvent naphtha, low boiling petroleum fractions, etc.

Solid extending agents are very useful. In using this type of extending agent, the active ingredient is either adsorbed or dispersed on or in the finely divided solid material. Preferably the solid extending agents are non-hygroscopic materials which render the composition dry and free flowing. Suitable solid extending agents include the natural clays, such as china clays, the bentonites and the attapulgites; other minerals in natural state, such as talc, pyrophyllite, quartz, diatomaceous earth, fuller's earth, chalk, rock phosphate, kaolin, kieselguhr, volcanic ash, salt, and sulfur; the chemically modified minerals, such as acid-washed bentonite, precipitated calcium phosphate, precipitated calcium carbonate, calcined magnesia, and colloidal silica; and other solid materials such as powdered cork, powdered wood, and powdered pecan or walnut shells. These materials are generally used in finely-divided form, such as no larger than 20–40 mesh, and preferably in much finer size.

The control compositions may be prepared in the form of concentrates having higher concentrations of the active agent than necessary for application and later diluted for use in the field. In such concentrate compositions, the active control agent might constitute, for example 5% to 95% by weight of the composition. The chemical control agents in accordance with the present invention are applied to the areas which are to be protected from the birds. If roosting areas, as on buildings or trees, the agents, alone or with a carrier, are simply applied to the surfaces upon which birds roost so that the bottoms of the birds' feet will contact the material. The agents can be applied to bird habitats by such methods as spreading, painting, flooding and spraying, and in solid or liquid form.

The following examples serve to more fully illustrate and explain the invention.

Example 1

In these tests, caffeine was applied to the feet of various birds to determine its effect. Alkaloidal caffeine in a variety of diluents or solvents was applied, using a paint brush, to the feet of starlings every hour for a maximum of 13 applications. Caffeine concentration in each instance was about 25%. The birds were individually caged and offered poultry feed and water ad libitum. Food and water intake was monitored as being indicative of the drug's effect. Results are as follows:

TABLE 1

| No. of birds | Carrier | Food intake in grams in 24 hrs. | Water intake in ml. in 24 hrs. | No. of deaths in 24 hrs. |
| --- | --- | --- | --- | --- |
| 3 | 70% alcohol | 0.9 | 7 | 2 |
| 3 | DMSO | 1 | 6 | 2 |
| 3 | NaOH (dilute) | 14 | 8 | 3 |
| 3 | Glycerin | 4 | 7 | 3 |
| 3 | Mineral oil | 5 | 9 | 2 |
| 3 | Peanut oil | 7 | 7 | 2 |
| 3 | Talc | 10 | 11 | 2 |
| 3 | Water | 14 | 19 | 1 |
| 3 | Butyric acid | 4 | 9 | 3 |
| 3 | Sulfuric acid (dilute) | 20 | 27 | 2 |

The starling has a voracious appetite; an adult will typically consume about 30 to 35 g. of grain-type food per day. Water consumption is somewhat more variable but will usually range from about 30 to 50 g. per day. Consumption of food and water after treatment serves as a convenient, semi-quantitative measure of the effect produced by the absorbed caffeine. As may be seen by inspection of the data, caffeine was absorbed by starlings regardless of the composition of the diluent or solvent. Heavy, non-volatile diluents or solvents, such as glycerin, peanut oil and mineral oil, proved to be as effective as DMSO. Absorption of caffeine from powdered talc also proved to be remarkably effective. In addition to the greatly decreased food and water consumption and the deaths caused by absorption of the caffeine, there occurred a high degree of inactivity in most of the birds shortly after treatment began.

Additional tests were performed on grackles, English sparrows and cowbirds using essentially the same procedure as previously described. In each instance effects and results generally similar to those observed in starlings were obtained.

The term "caffeine" as used herein is to be understood as including the 1,3,7-trimethylxanthine and caffeine in all of its commonly available salt forms, such as caffeine acetate, caffeine benzoate, caffeine citrate, caffeine hydrochloride, caffeine phosphate, caffeine salicylate, caffeine sodium benzoate, caffeine sulfate, etc., as well as the monohydrate, as well as such closely related derivatives as 1,3,7-triethylxanthine.

Example 2

Saturated solutions of lithium carbonate in a number of different carriers or solvents were applied to the feet of birds. Results were as follows:

TABLE 2

| | | Deaths | | | |
| --- | --- | --- | --- | --- | --- |
| Agent | Carrier | Day of expt. | 24 hrs. | 48 hrs. | 72 hrs. |
| Li carbonate | NaOH | 0 | 1 | 1 | 2 |
| Do | DMSO | 0 | 2 | 2 | 3 |
| Do | Glycerin | 0 | 1 | 2 | 2 |
| Do | Peanut oil | 0 | 1 | 2 | 2 |

In spite of the limited solubility of lithium carbonate in such materials as glycerin and peanut oil, those carriers were as effective as an aqueous sodium hydroxide solution. Additional tests were run using lithium chloride. This salt appeared to be more effective than the carbonate, possibly because of its greater solubility.

Another series of tests were performed in an identical manner using sodium chloride as the treating agent. All of the birds subjected to this treatment appeared completely normal throughout the experiment. However, all birds exhibited increases consumption of both water and food. Within two days after the experiment, water and food consumption had dropped to normal levels. It was concluded that inorganic, ionic salts of both lithium and sodium were readily absored through the feed of birds. Lithium ions could be absored in sufficient amount to produce lethal results.

Example 3

Anorexic compounds, such as amphetamine, were found to have a marked appetite depressing effect when applied to the bottom of birds' feet. Amphetamine sulfate in 0.001 N CHl was painted on the feet of a number of blackbirds and the food intake measured under controlled conditions, with results as follows:

TABLE 3

| | Approximate daily food intake (grams) | | | | |
| --- | --- | --- | --- | --- | --- |
| | Five days before application | Day before application | Day of application | First day after | Second day after | Third day after |
| Control birds (12) | 14 | 11 | 16 | 15 | 14 |
| Treated birds (11) | 14 | 3 | 14 | 13.5 | 14 |

Amphetamine sulfate was applied to the feet of cowbirds, with results:

TABLE 4

| | Approximate daily food intake (grams) | | | | |
| --- | --- | --- | --- | --- | --- |
| | Seven days before application | Day of application | First day after | Second day after | Third day after |
| Control birds | 8.5 | 5 | 8 | 8 | 10 |
| Treated birds | 8.5 | 1 | 2.5 | 5 | 8 |

While amphetamine did not kill the experimental birds, it did drastically reduce the food intake. In a natural environment, this would be sufficient to markedly reduce the survival rate.

Example 4

Saturated solutions of amobarbital in 70% ethyl alcohol, dimethyl sulfoxide and 0.1 N sodium hydroxide were applied to the feet of starlings. Consumption of water and food during the experiment was drastically reduced. All of the experimental birds died shortly after the test ended.

Example 5

Procaineamide hydrochloride was administered to a number of cowbirds by painting the bottoms of their feet. Carrier vehicles or diluents used included water, dimethylsulfoxide and glycerin. Results were characterized by inactivity, a lessened consumption of food and water and, in most cases, death followed. Glycerin was found to be superior either to water or dimethylsulfoxide as a diluent or solvent.

Example 6

Phenmetrazine (3-methyl-2-phenylmorpholine) in the hydrochloride form was applied by painting the feet of starlings. The compound was applied as saturated solutions in 70% ethyl alcohol, dimethylsulfoxide and dilute sodium hydroxide. None of the experimental birds consumed food after the experiment began. All first became inactive, then sleepy and all thereafter died.

Example 7

Trifluoperazine dihydrochloride was applied to the feet of starlings. Application was by painting saturated solutions of the drug dissolved in 70% ethyl alcohol, dimethylsulfoxide and dilute sodium hydroxide. The solutions were re-applied hourly. All birds appeared normal for the first few hours after the tests began. Thereafter, all became progressively less and less active and finally died.

What is claimed is:

1. A method for increasing the mortality rate of birds which comprises contacting the skin of the birds' feet with an avicidally effective quantity of a bio-affecting substance selected from the group consisting of caffeine, an inorganic, ionic lithium salt, amphetamine, amobarbital, procaineamide, phenmetrazine and trifluoperazine whereby said bio-affecting substance is absorbed into the bird's blood stream through the cell mass on the bottom of their feet to produce severe distruption of normal physical and metabolic activity.

2. The method of claim 1 wherein the bio-affecting substance is dissolved, absorbed or suspended in an inert extending agent and wherein the concentration of said bio-affecting substance is greater than 1%.

3. The method of claim 2 wherein the bio-affecting substance is applied to roosting and nesting surfaces frequented by birds whereby the birds' feet contact said substance upon roosting or nesting.

4. The method of claim 3 wherein the bio-affecting substance is caffeine.

5. The method of claim 4 wherein the inert extending agent is selected from the group consisting of glycerin, a vegetable oil, mineral oil and an absorbent solid.

6. The method of claim 3 wherein the bio-affecting substance is selected from the group consisting of lithium carbonate and lithium chloride.

7. The method of claim 6 wherein the extending agent is selected from the group consisting of glycerin and a vegetable oil.

8. The method of claim 3 wherein the bio-affecting substance is procaineamide hydrochloride.

9. The method of claim 3 wherein the bio-affecting substance is phenmetrazine hydrochloride.

10. The method of claim 3 wherein the bio-affecting substance is trifluoperazine dihydrochloride.

References Cited

UNITED STATES PATENTS

| | | | |
|---|---|---|---|
| 2,967,128 | 1/1961 | Kare | 424—310 |
| 3,340,142 | 9/1967 | Reinert et al. | 424—304 |

OTHER REFERENCES

Merck Index 7 ed. 1960, p. 71 (I), p. 72 (II), p. 1064 (III), p' 681 IV, pp. 853–4 (V)b Spector: Handbook of Toxicology, 1957, pp. 56 and 180.

Shuyler: "Bird Control in Kansas City"—Pest Control 31, pp. 9–16, September 1963.

Hockenyos: "Pigeons, Starling and English Sparrows." Proceedings Vertebrate Pest Control Conference, pp. 271, 281, February 1962.

Merck Index (VI) 8th ed., 1968, p. 188.

Merck Index (VII) 8th ed., 1968, p. 800.

ALBERT T. MEYERS, Primary Examiner

L. SCHENKMAN, Assistant Examiner

U.S. Cl. X.R.

424—127, 246, 248, 253, 254, 324